United States Patent [19]

Schmidt

[11] Patent Number: 5,275,833
[45] Date of Patent: Jan. 4, 1994

[54] REMOVING GREEN COLOR FROM AND REDUCING FLAVOR LEVELS OF FIBROUS AND OTHER GRANULAR MATERIAL

[76] Inventor: Edward D. Schmidt, 10484 Colorado Ave., Bloomington, Minn. 55438

[21] Appl. No.: 825,072

[22] Filed: Jan. 24, 1992

Related U.S. Application Data

[63] Continuation-in-part of Ser. No. 686,360, Apr. 17, 1991, abandoned, which is a continuation-in-part of Ser. No. 504,649, Apr. 2, 1990, abandoned, which is a continuation-in-part of Ser. No. 339,482, Apr. 17, 1989, abandoned, which is a continuation-in-part of Ser. No. 90,089, Aug. 24, 1987, abandoned.

[51] Int. Cl.$^5$ .............................................. A23L 1/277
[52] U.S. Cl. ................................... 426/253; 426/254; 426/255; 426/258; 426/549; 426/431; 426/804; 426/539; 426/551
[58] Field of Search ............... 426/253, 258, 254, 255, 426/431, 804, 807, 478, 549, 551, 539

[56] References Cited

U.S. PATENT DOCUMENTS

| | | | |
|---|---|---|---|
| 1,131,698 | 3/1915 | Hobbs | 426/253 |
| 1,957,335 | 5/1934 | Haas | 426/253 |
| 2,087,547 | 7/1937 | Penn | 426/253 |
| 2,272,577 | 2/1942 | Penn | 426/254 |
| 2,379,335 | 6/1945 | Baher | 426/254 |
| 2,478,043 | 8/1949 | Evans | 426/253 |
| 3,574,634 | 4/1971 | Singer | 426/549 |
| 3,676,150 | 7/1972 | Glicksmann | 426/254 |
| 3,979,523 | 9/1976 | Titcomb | 426/254 |
| 4,237,170 | 12/1980 | Satin | 426/555 |
| 4,241,093 | 12/1980 | Farag et al. | 426/258 |
| 4,307,121 | 12/1981 | Thompson | 426/431 |
| 4,451,489 | 5/1984 | Beale et al. | 426/254 |
| 4,649,113 | 3/1987 | Gould | 426/807 |
| 4,711,786 | 12/1987 | Schmidt | 426/549 |
| 5,023,103 | 6/1991 | Ramaswamy | 426/626 |
| 5,069,919 | 12/1991 | Weibel | 426/261 |

FOREIGN PATENT DOCUMENTS

| | | | |
|---|---|---|---|
| 0008292 | 7/1927 | Australia | 426/254 |
| 0502162 | 5/1954 | Canada | 426/254 |
| 0008091 | 10/1903 | United Kingdom | 426/253 |
| 0688428 | 3/1953 | United Kingdom | 426/253 |

*Primary Examiner*—Jeanette Hunter
*Attorney, Agent, or Firm*—Clayton R. Johnson

[57] ABSTRACT

High dietary fiber from sources that have had minimal use in food products, for example bakery goods, extruded items and pasta, for humans because of their green coloration and inherent flavors. The fibrous material is immersed in an aqueous dispersion of chlorine for a period of time with a concentration of chlorine that is effective for removing substantially all of the coloration from the material with a minimal effect on the fiber matrix, for example three to thirty minutes with one part fiber to five parts water and about 13,500 to 62,400 ppm chlorine. Advantageously the thus bleached material is then water rinsed and immersed in a 4-50% aqueous solution of peroxide at a temperature of about room temperature to boiling for up to about 15 minutes or until the fiber flavor and chlorine backnotes are rendered blander.

Alternately the fibrous material is treated in a peroxide solution of at least about 4% peroxide concentration at an elevated temperature for at least about 5 minutes to bleach and deflavor the fibrous material.

46 Claims, 4 Drawing Sheets

REMOVING GREEN COLOR FROM AND REDUCING FLAVOR LEVELS OF FIBROUS AND OTHER GRANULAR MATERIAL

RELATED APPLICATIONS

This application is a continuation-in-part application of my application Ser. No. 07/686,360, filed Apr. 17, 1991 (now abandoned) that is a continuation-in-part of my application Ser. No. 07/504,649 filed Apr. 2, 1990 (now abandoned) which is a continuation-in-part application of my application Ser. No. 07/339,482, filed Apr. 17, 1989 (now abandoned) that in turn is a continuation-in-part application of my application Ser. No. 07/090,089, filed Aug. 24, 1987 (now abandoned).

BACKGROUND OF THE INVENTION

1. Field of the Invention

This invention relates to a process for treating plant materials to remove color and flavor for providing a lighter colored, blander tasting flour; and in particular to providing a flour of sufficient whiteness for use in food products. By treating fibrous material, a flour with a relatively high dietary and low crude fiber content is formed.

2. Description of the Prior Art

A primary source of lightly colored fiber presently used in fiber flours for bakery goods is obtained by processing bark and other by-products of trees, the fiber thus obtained being mostly crude fiber. The fiber flour is produced from an acceptable "food source", however, there is growing concern about eating what is referred to as a "furniture fiber". Also, fiber from cottonseeds is being produced and marketed, however, the fiber obtained is mostly crude fiber and again there is concern about eating what is referred to as "clothes fiber".

For over a half century, technology for bleaching bread flours has been well researched and defined by the baking industry. "Bleaching as it relates to edible flour is defined as the removal of color by oxidation of the yellow flour pigment"; "coloring matter of bran is not effected by bleaching agents", (Pyler, Baking Science and Technology, Siebel Publishing Company, second printing 1979). A review of the prior art shows scientists exposing cereal grain flour to, for example, nitrogen peroxide, chlorine, nitrogen trichloride, benzoyl peroxide and enzyme active legume flours for the improvement of color (whitening the yellow pigment) and maturing and improving wheat flour. Through the years the industry has, for the most part, settled on the use of enzyme active legume flours (lipoxidase found in pea and soy flours) and benzoyl peroxide (such as "LA Novadelox"), for removing color from cereal grain flour used in making bread. Other methods have fallen by the wayside. Techniques applicable for the removal of yellow color (carotinoids) do not work for the removal of green color (chlorophyll) or darker brown colors.

Many techniques have been developed for bleaching a yellow fiber, a more neutral color than green or brown, however, green or brown are colors that are much more difficult to bleach in order to obtain a desirable light colored, and especially to near white or white, bran material. In developing a desire bleaching process one would have to consider the number of bleaching agents available such as nitrogen peroxide, hydrogen peroxide, organic peroxides, chlorine, chlorine dioxide, hypochlorites, nitrogen trichloride, sulfites, bisulfites, meta-bisulfites, lipoxidases, alcohol, etc. Further, there is the aspect of having to consider the possible number of combinations of such bleaching agents and process parameters, including acidity, alkalinity, temperature, dilutions, processing times, states of matter (solid, liquid and gas), additives, delivery systems, general procedures, etc.

One of the earliest patents that I am aware of relative to bleaching cereal grains is Cooper and Westgate (U.K. patent no. 8091, dated October 1903) which discloses conditioning or improving the quality and color of bran or fibrous tissue of wheat or other cereals by exposing them to chemical sulphur or chlorine in a gaseous form. Tests that I have made show that the application of chlorine gas does not satisfactorily whiten brown (yellow pea hull) or green (green pea hull) material for use in food products.

Australian patent 8,292 (1927) to Buhler, Canadian patent 502,162 to Houtgraaf and U.S. Pat. No. 2,478,043 to Evans teach the application of chlorine in the form of chlorine dioxide to bleach or mature cereal grain flours or bran. Buhler discloses chlorine in an acid form is undesirable for shortening the maturing or bleaching of wheat flour because of the increase in the acid content of the flour itself; and that chlorine dioxide, a more alkaline compound, is more desirable. Buhler applied chlorine in a gaseous or liquid state dissolved in an organic or an inorganic solvent, not in an aqueous dispersion such as in the present invention.

Houtgraaf acknowledges that chlorine dioxide has a favorable influence on bakery flour but was used to a small extent because of the difficulty in preparation and measuring correct quantities of chlorine dioxide. The Houtraaf invention is directed to a method for accurately metering gas to be applied in a dry system wherein an aqueous solution containing the chlorine dioxide is supplied in degassing apparatus and then the product to be treated is subjected to chlorine in a gas stream. Houtgraaf discloses using 5-15 grams of chlorine dioxide per liter.

Evans, U.S. Pat. No. 2,478,043, discloses that the amount of an agent such as chlorine, hydrogen peroxide and nitrogen trichloride for bleaching carotene and related bran pigments is so much greater than that required to bleach bread flour that the treatment deleteriously effects the flour. This patent suggest treating the whole wheat kernel topically with the oxidizing agent at 2 to 8 ozs. per 280 lbs. of wheat in the presence of water. The results of tests conducted under my direction of applying chlorine dioxide in the ranges recommended by Evans and Houtgraaf to yellow and green pea hulls and as outlined by Buhler, Houtgraaf and Evans showed that the application of chlorine dioxide did not effectively render fibrous materials white, or off-white or reduce flavor levels. In fact, during treatment with chlorine dioxide, fibrous material developed a deeper brown color and less desirable off taste.

Baker, U.S. Pat. No. 2,379,335, added chlorine dioxide to water used to temper cereal grain to prevent bacterial and mold growth as well as bleaching the exterior portions of wheat and water extractable materials. The method disclosed for bleaching water extractable coloring matter from cereal grains is by treating grain with either (1) a dilute mixture of chlorine dioxide and chloride in air in an aqueous solution with an added non-volatile inorganic water soluble alkaline substance or (2) a dilute mixture of chlorine dioxide, a peroxide and a water soluble alkali substance. Baker discloses using 30–500 ppm each of chlorine dioxide and chlorine for 1–5 minutes.

Thompson, patent U.S. Pat. No. 4,307,121, discloses a method for isolating cellulose by solubilizing and removing non-cellulosic components from such yellow pigmented fibers as yellow soybean hulls, yellow pea hulls, yellow corn bran, and etc. In particular, the method described is a series of heating, treating (3 separate applications of chlorine and one application of caustic) and extraction steps. The first treatment is in a saturated chlorine solution for a period of six to eighteen hours. A white powder to be added to bread formulations is the end results. However the process disclosed in this patent results in the loss of all but one of the desirable fiber components (an unbalanced fiber matrix). The results obtained in using the Thompson process, about 50% of the fiber was lost, bread made with cellulose added, as the source of edible fiber, requires the addition of vital wheat gluten and other crutches to obtain a reasonable bread volume.

As to using chlorine as a bleaching agent for flour, one of the early patents that describes a procedure for bleaching flour with chlorine is Hobbs (U.S. Pat. No. 1,131,698) which discloses the addition of one pound of hypochlorite to 2500 pounds of wheat flour (a dry blend) for 24 hours as being effective. This amounts to 4,000 ppm. Hobb's recommends the addition of an acid to neutralize the alkalinity to eliminate subsequent delay in the fermentation of bread.

Penn (U.S. Pat. No. 2,087,547) found that a dry free flowing finely powdered chlorine liberating compound, such as calcium hypochlorite, can be reacted with organic peroxides and other peroxidized products to form a gaseous agent to be used to bleach, mature and improve wheat flours and other grain flours, vegetable flour and milling products in general. U.S. Pat. No. 2,192,100 to Penn uses a mixture of an alkaline metal nitrate and active organic peroxide to bleach and mature wheat flour. Benzoyl peroxide used alone in sufficient quantities for complete bleaching of flour reduces volumes of the bakery products obtained and thereby necessitates the addition of the nitrate to overcome the reduction of volumes. Penn—U.S. Pat. No. 2,272,577, discloses that additives such as alkali metal salts can be added to active organic peroxides to prevent flamability of the peroxides.

Both of the Penn patents and Hobbs disclose using dry systems in applying hypochlorite, however, such dry processes do not remove green color from green colored fibers, for example, green pea hulls. U.S. Pat. No. 1,957,333 to Haas and Bohn and U.S. Pat. No. 1,957,335 to Haas disclose enzymatic bleaching or decolorization of carotene from wheat flour, however, on the basis of tests that I have conducted, enzymes such as lipoxidase, do not whiten fibrous materials and the peroxide process of Penn U.S. Pat. No. 2,192,100 does not bleach fibrous materials, for example green pea hulls and parsley.

Farag (U.S. Pat. No. 4,241,093) is directed to obtaining a bland flavored supplement by contacting vegetable or fruit pulp with a number of aqueous bleaching solutions, including sodium hypochlorite, chlorine, chlorine dioxide and hydrogen peroxide and combinations thereof at a 0.5 to 35% range (preferably at the 0.5 to 2% range). Farag, with reference to sugar beet pulp, indicates that his process can be carried out at room temperature but to reduce retention time the process can be carried out at about 60° C. (140° F.) to about 90° C. (194° F.). Farag states that using "temperatures between 60° C. and 80° C. with a bleaching agent concentration of about 1% by weight produces hood results with retention times of from 30 to 60 minutes." However tests that I have conducted and/or under my direction showed that 1% peroxide not effective and at least a 3% peroxide solution is required even when boiling the slurry. While Farag discloses using bleaching solutions at the 35% level, I have found that the addition of chlorine ($Cl_2$) above about 6.24% starts degradation of the fiber matrix. Additionally my tests indicates the solution overheats and becomes acidic when calcium hypochlorite is added much over the 10% level, having a possible detrimental effect on the product being treated.

Further, my tests confirm the findings in the Beal patent, U.S. Pat. No. 4,451,489, whereby hydrogen peroxide added at the 2% level to sugar beet pulp resulted in an off-flavored and off-colored ingredient contrary to what is disclosed in the Farag patent. Beal relates to the production of a non-caloric sugar beet bulking agent comprised by placing sugar beet pulp material into a stabilizing solution (water soluble bisulfides, sulfities and metabisulfites) to prevent darkening, water washing the product to remove a majority of soluble carbohydrates, contacting the product with an alcoholic solution to remove color and bitter constituents, removing the water and alcohol and milling the product to a flour like consistency. This is in contrast to the present invention wherein chlorine, peroxide or a combination first chlorine and then peroxide is utilized to achieve the desired results.

U.S. Pat. No. 4,649,113 to Gould found that upon adding about a 1% solution of peroxide to non-woody lignocelluloics and adjusting the pH to 11.2 to 11.8, the substrate became partially delignified. That is, Gould is directed to converting plant components to useful carbohydrates for ruminants and microbes which is in contrast to the present invention wherein peroxide is applied in a way not to disturb plant fiber components.

Gould, Penn and Farag do not teach a peroxide treatment at an elevated temperature and a concentration such as discovered by applicant for bleaching a fibrous material to an off-white or white coloration such as set forth hereinafter.

The British patent to Davies, patent no. 688,428, discloses chlorine "bleaching sago flour" (a starch product) while maintaining pH's of either 4–5 or 11–11.5 to prevent a decrease in viscosity during processing. Thereafter hydrogen peroxide is used to remove free chlorine and thence NaOH or HCl is added to the slurry to bring the pH to 6–7 to prevent the otherwise loss of viscosity of the flour. This is in contrast to not having to maintain a pH within a narrow pH range during a bleaching process.

It has been common practice in the food industry to whiten products (such as icings, panned confections, creme fillings, etc., by the addition of titanium dioxide. It has been found that while titanium dioxide can be added to whiten fibrous material, upon processing a product, such as bread, with titanium dioxide added as a whitening agent, an unappealing, unnatural, pastey colored product is the end result.

Patents covering the development of low calorie bakery products include the patents to Glade, Singer, Glickman, Titcomb, and Thompson '018 patents that are referred to below. All of these patents are based on the addition of additives to help carry the fiber.

The Glade U.S. Pat. No. 3,573,061 found that to make an acceptable low calorie bread, the seed coats (the fiber source), the seed coats had to be treated with an acid and an emulsifier selected from the group consisting of egg yolks, lecithin and a combination thereof.

Singer (U.S. Pat. No. 3,574,634) developed a formula whereby the addition of wheat gluten and gum were used to help carry cellulose in bakery, pasta and other foodstuffs to produce food products of lower calorie content. Hydrating the gluten, a protein in wheat, gives the dough rubber-like properties that allows the bread to rise. Without gluten, bread loses the ability to become aerated. Glicksman, U.S. Pat. No. 3,676,150, discovered a way to prepare a low calorie bread product without the addition of wheat gluten. Glicksman's formula requires the addition of cellulose, starch and gums to the product. Glicksman's formula has the advantage over Singer's in that it enables the baker to produce a gluten free bread. Titcomb (U.S. Pat. No. 3,979,523) produced a low calorie white bread eliminating the gum but adding wheat gluten to help carry the inert cellulose. Thompson (U.S. Pat. No. 4,109,018) developed a low calorie bread formulation, calling for the addition of a vital wheat gluten, a second protein source, purified alpha cellulose and a hydrophyllic gum.

U.S. Pat. No. 4,237,170 to Satin and my U.S. Pat. No. 4,711,786, disclose using yellow and green hull fibers for making a bakery product. However, such green or yellow hull fiber flours do not have a color similar to the color of unbleached wheat flour (which has the wheat bran and germ removed), nor a white or off-white color nor a relatively low flavor profile required to formulate a low calorie (⅓ calorie reduction) pleasant tasting white bread or other food product. In the process of '786, triticale was added to mask the undesirable color, odor and flavor.

Soy beans containing about 34% protein, 33% carbohydrate, 18% fat, 10% water and 5% fiber are a good source of protein, fat and fiber. The removal of oil, water and fiber (hulls) commercially results in a dry flour containing about 50% protein. While soy flour is presently being used by the food industry as a protein supplement (bakery items, health drinks, etc.) its usage would be greater if its inherent beany flavor were removed. Researchers have tried for decades to render soy flour bland.

In accordance with tests I have made, peroxide applied to fibrous material as set forth hereinafter remove all types of flavors absorbed and inherent in the product in contrast to adding peroxide to remove free chlorine as set forth in the above Davies patent. Also in accordance with my findings, treating green, yellow and brown fiber with chlorine in a gaseous, dry or liquid form as called for in the Cooper and Westgate, Buhler, Hobbs, Penn, Baker, Evans/Houtgraaf, Farag and Thompson patents does not produce the desired bleaching action such as that obtained by a peroxide application, following the chlorine treatment to produce the action such as set forth hereinafter.

The use of green pea hulls and other green colored vegetable items as a source of fiber that is incorporated as a component of a food product for human consumption, for example, in a bakery product, has been relatively limited due to green coloration and inherent flavors not compatible with consumer tastes, resulting in making the product objectionable to many customers.

In order to obtain a lighter colored (preferably at least off-white, if not white), blander flavor high fiber flour with a better balance of soluble and insoluble fiber from a highly colored fibrous source such as green vegetables and sugar beet pulp and from oat fiber and brown wheat fiber, this invention has been made.

SUMMARY OF THE INVENTION

The present invention discloses a process for removing color (whitening) and flavor, including at least substantially all color and favor, from almost any green vegetables including green vegetable fiber flour or flour; for example lettuce, parsley, green pepper, etc., and green pea hulls, almost any yellow vegetable or cereal grain fiber or flour (for example, yellow pea hulls, soy hulls and soy flour), and almost any brown vegetable or cereal grain fiber or flour (for example, wheat bran, oat fiber and sugar beet pulp) to obtain a fiber material usable in making light colored edible food products. The green color is removed by placing the material, from which the green color is to be removed, in an aqueous dispersion of chlorine or a chlorine containing compound suitable for use in preparing food products for human consumption, for example calcium or sodium hypochlorite in a concentration and a period of time to remove the green color with a low loss of the various fiber components of the fibrous material. Advantageously the chlorine treated material is then immersed in a solution of a suitable peroxide compound long enough to remove inherent flavors together with any imparted by the chlorine. One example is treating green pea hulls to obtain a fiber flour for use in making light colored bakery products or other edible products. I have surprisingly also discovered that flavoring components (inherent and/or imparted, for example chlorine during a chlorination treatment) can be removed from almost any edible granular and fibrous material, regardless of color, by applying my peroxide treatment following the chlorination step. In place of the chlorination step, a peroxide (preferably hydrogen peroxide) solution, at an elevated temperature, advantageously at a temperature at least near boiling, or a peroxide solution applied and then steam sprayed onto the dampened or wetted fiber, can be using for bleaching fibrous material to remove color and flavor components without destroying the fiber matrix whereby a white fiber products can be obtained. For example green pea hulls can be treated in a boiling peroxide solution to obtain a white bread flour for use in obtaining edible food products.

One of the objects of this invention is to provide a new and novel process for bleaching various green vegetables to remove the green color or yellow and brown cereal grains to remove colors to obtain a lightly colored (including white) fibrous material usable in making an edible food product. In furtherance of the above object, another object of this invention is to provide a new and novel process for removing the green color, yellow color, and brown color from edible hulls with minimally effecting the complex matrix of the various components. Still another object of this invention is to provide a new and novel process for bleaching edible hulls to obtain an off-white or white hull material while minimally effecting the complex matrix of the hulls.

Another objective of this invention is to provide new and novel food products relatively high in fiber, with a complete fiber matrix (e.g., containing both soluble and insoluble fiber) including bread, rolls, biscuits, muffins, cereals, snacks, pasta or almost any high fiber food product. In furtherance of the last mentioned object, it is another object of this invention to make a food product that incorporates vegetable or cereal grains or legume fiber flour that has been beached, including to at least off-white and white, to remove its normally green or other color and treated to reduce flavor levels.

A still further object of this invention is to provide a new and novel process for bleaching fibrous materials such as yellow and green pea hulls, cereal grains, wheat bran and sugar beet pulp to provide a material of a more desirable coloration and preferably without coloration (white).

Another objective of this invention is to provide a new and novel process for removing flavor from edible fibrous material, for example edible pea hulls.

Still another object of the invention is to provide a new and novel fiber flour which contains a smaller amount of cellulose per total amount of fiber and thereby does not require the addition of, for example, vital wheat gluten, gums, etc when making a high fiber, low calorie bakery product.

Another objective of this invention is to bleach or whiten green, yellow and brown fibrous material, including to at least an off-white coloration, without the formation of polychlorinated dibenzo dioxins (PCDD—s) which at the present time are believed to be carcinogenic. Still another objective is the bleaching or whitening of almost any flour (fibrous or non-fibrous), for example, pea flour.

Figure 1:
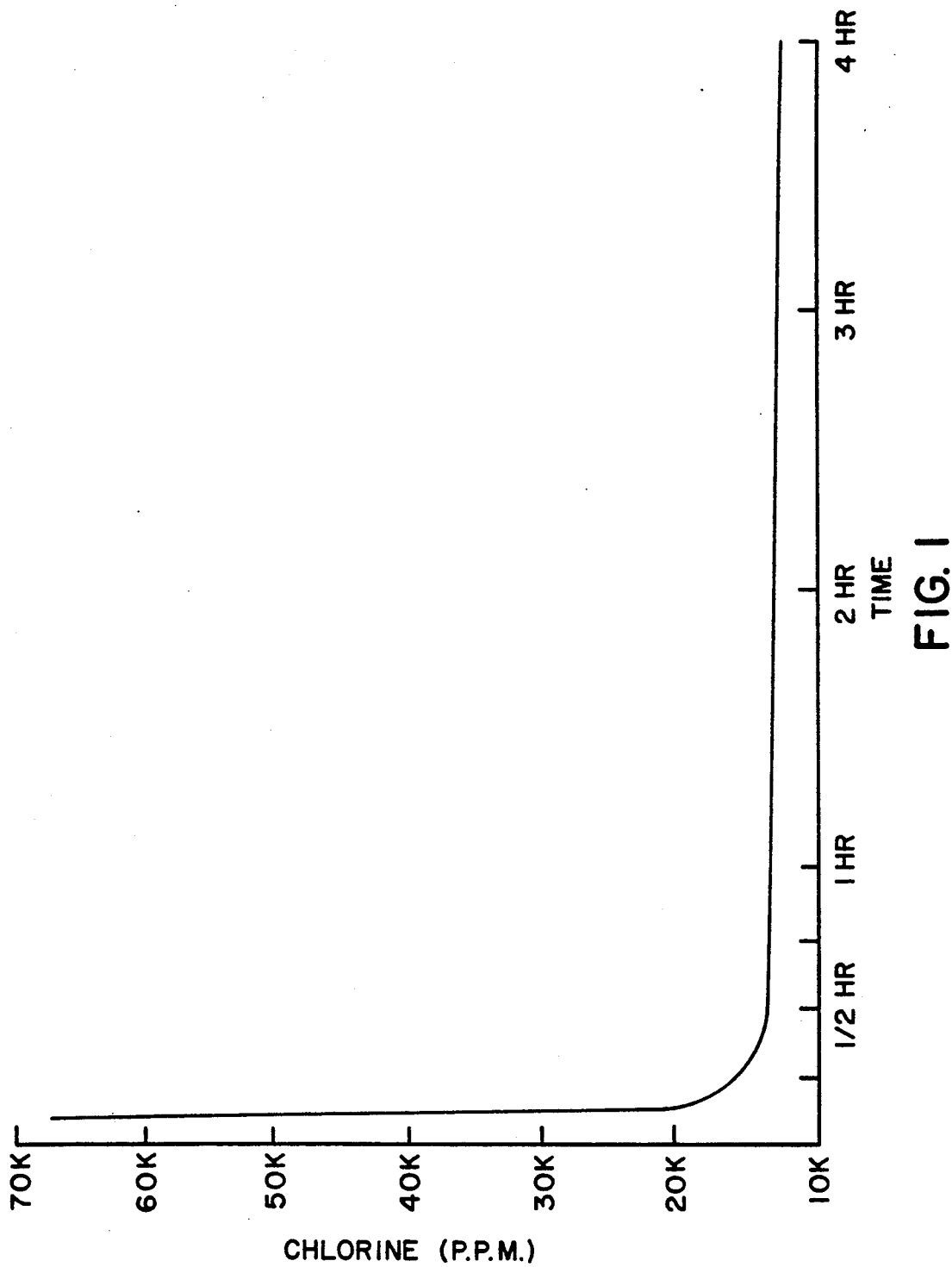
FIG. 1 is a graph illustrating the bleaching time of green pea hulls versus concentrations of chlorine with there being one part of hulls to five parts of dispersion.

The term "unprocessed" as used herein refers to the fibrous material, which is to be bleached or subjected to the flavor removing treatment, that has not been cooked, or subjected to a chemical treatment other than for the peroxide and chlorine treatment disclosed herein as the invention, or a water or other type extraction treatment prior to the bleaching and flavoring removing treatment of this invention, but may include material that has been comminuted or water washed to remove such as dirt, or, for example screened to separate out foreign matter or undesired sized material and soy bean material that has been subjected to an oil removal process.

In accordance with a preferred form of this invention, fibrous materials are treated first in an aqueous dispersion of chlorine in the form of a gas, liquid or solid to remove the green color (chlorophyll) and secondly may be treated with a peroxide solution to remove flavor components and chlorine backnotes. As an example, green pea hulls, a by-product of splitting green peas, are milled and put into aqueous dispersion. Chlorine is then applied either in the form of a gas or solid (that is acceptable for food processing such as calcium or sodium hypochlorite). Since chlorine gas is commonly used to insure the potability of water, the equipment involved and techniques are readily available. Applications of the gas requires the injection of the gas into running water used to soak the hulls. After the bleaching of the hulls is complete, product is preferably thoroughly washed to preferably remove and residue. Product is generally dried for storage purposes (shelf life).

The bleached, washed product in either wet or dried form is then immersed into a non-toxic peroxide solution, preferably a hydrogen peroxide aqueous solution (at least about 3% and desirably at least about 4%) until inherent and imparted flavors (for example, chlorine backnotes) are removed to render a blander product. After being thoroughly washed and dried, the last mentioned product is milled, preferably so that about 99% of it will flow through an 80 mesh screen. The finer the grind size the lighter will be the color of the resulting product.

PROCEDURE #1

Working with chlorine gas, the required amount of gas is injected into a stream of water cascading into a tank containing the required amount of green pea hulls. A final mixture in the tank of about 5 parts water to one part hulls is desirable. Gas chlorinators used were supplied by Wallace and Tiernan. Since chlorine becomes quite corrosive, equipment should be glass lined, Teflon lined or lined with another material resistant to corrosive action.

Generally it takes about 1# of chlorine in the gaseous form to bleach about 75# of hulls. Product is generally stirred, the desired color transformation takes from 3 minutes to 30 minutes. Chlorine residue is then flushed by running additional water from the top.

It usually take several risings before the chlorine residue (active chloride) is removed from the hulls, depending upon the excess capacity of the tank. Hulls are then removed from the tank and placed on a scalper (vibrating screen) where the product is washed and excess water is shaken off.

Pea hulls have high water absorption properties that increase as the particle size of the hull is decreased; however it becomes difficult to decant, shake or wash the chlorinated water from the hulls if the hulls have been milled to less than a 1 mm size (18 mesh screen). The hulls can then be dried in a fluid bed drier and thence milled, if desired, and thereafter used, for example as high fiber flour, for incorporation in a bakery product. However, the rinsed product of the preceding paragraph, with or without drying, is thence immersed in an aqueous solution of not less than about 3.0% and preferably not less than 4% peroxide until flavors (including remaining traces of chlorine and inherent pea flavor components) are removed (about 15 minutes). Thence the peroxide treated product preferably is water rinsed and after it is dried in a rotating drum drier, it pulverized fine enough so that 99% of the fiber will flow through an 80 mesh screen.

PROCEDURE #2

Green pea hulls and calcium hypochlorite are placed in an aqueous dispersion inside a glass lined tank in the following weight based ratios:

0.7 parts calcium hypochlorite
5 parts hulls 25 parts water

Paddies, immersed in the mix, rotate in the tank for about ten minutes during which the green color is removed from the hulls completing the bleaching treatment. Hulls are then deposited on a scalper and washed as the screen vibrates and all the calcium chloride residue is removed.

The chlorine treated product can then be dried, thence pulverized if desired and thereafter sold as a flour or mixed with other ingredients to make the desire end products, however after the chlorination treatment it is preferred that the product be treated with a 4.0% or more solution of hydrogen peroxide for about 15 minutes, advantageously at room temperature, or until deflavored, dried on a belt drier and pulverized as desired (preferably so that about 99% will flow through an 80 mesh screen).

The procedures outlined above can be interchanged (belt drier used in Procedure #1) and various modifications made (such as water carrying the hypochlorite (or chlorine gas) and hull slurry through a flume or pipe until the desired color change takes place), without deviating from the scope or spirit of this invention.

PROCEDURE #3

The following experiment was conducted to evaluate the effect of rendering fibrous material colorless by the addition of chlorine and the addition of chlorine followed by a peroxide treatment. Green pea hulls and calcium hypochlorite were placed in an aqueous dispersion inside a glass lined tank in the following weight based ratios:

0.7 parts calcium hypochlorite
5 parts green pea hulls
25 parts water

Agitators, immersed in the mix, rotated in the tank for about ten minutes during which the initial bleaching action is completed. Hulls were then deposited on a scalper and washed as the screen vibrates until all the active calcium chloride was removed. Product was then divided into two equal lots, lot #1 was set aside and lot #2 added back into the tank. A 6% hydrogen peroxide solution was added to tank #2, forming a slurry which was agitated for about 15 minutes. Product was once again placed on the vibrating screen and washed until free peroxide is removed.

Comparing lot #1 with lot #2, lot #1 had an off-white cream color and a slight chlorine flavor. Product of lot #1 had a tan/grey cast. Lot #2 had a cleaner off-white color (lacked tan/grey cast) and had a clean flavor.

Procedure #3 shows that treating a fibrous material with chlorine alone does produce an off-white flour but posses a tan/grey cast. The addition of peroxide (room temperature) was required to remove the tan/grey cast remaining after the chlorine treatment. If this cast is not removed, it becomes more dominant as the fiber flour is moistened and heated after being added to a food formulation, such as a white bread formula.

PROCEDURE #4

Tests were conducted to determine if peroxide applied at about room temperature removes free chlorine or reacts with the product as follows:

A slurry was prepared combining the following:
1 part yellow pea hulls
25 parts 5.25% sodium hypochlorite solution The resulting slurry was treated for 15 minutes to the disclosed above relative chlorine treatment and then the slurry subdivided into 3 equal parts.

Additional yellow pea hulls, which were added to part #1 to react with the free chlorine, if any. As a result of the addition of hulls, part #1 underwent a color change showing that part #1, prior to the addition of the additional hulls contained free chlorine.

Part #2 was washed with water in a manner that has been disclosed above and then additional hulls were added. The added hulls did not undergo a color change and thus showing the free chlorine had been removed by the water wash. Then a 8 percent hydrogen peroxide solution was added to the hulls. This treatment was continued for about 5 minutes and thence the hulls were water washed, free water shaken off and evaluated. The evaluated product had a blander taste than that prior to the peroxide treatment.

Part #3 was washed with a 8% peroxide solution. Additional hulls were added to container #3, but no color change was noted which indicated all the free chlorine had been removed. However the peroxide water washed product retained chlorine back notes and inherent hull flavors. The peroxide treatment of Parts #2 and #3 were at about room temperature.

Tests conducted under Procedure #4 show that peroxide as applied above, after a chlorine treatment and a water wash, removes inherent flavors, chlorine backnotes, and free chlorine.

Figure 2:
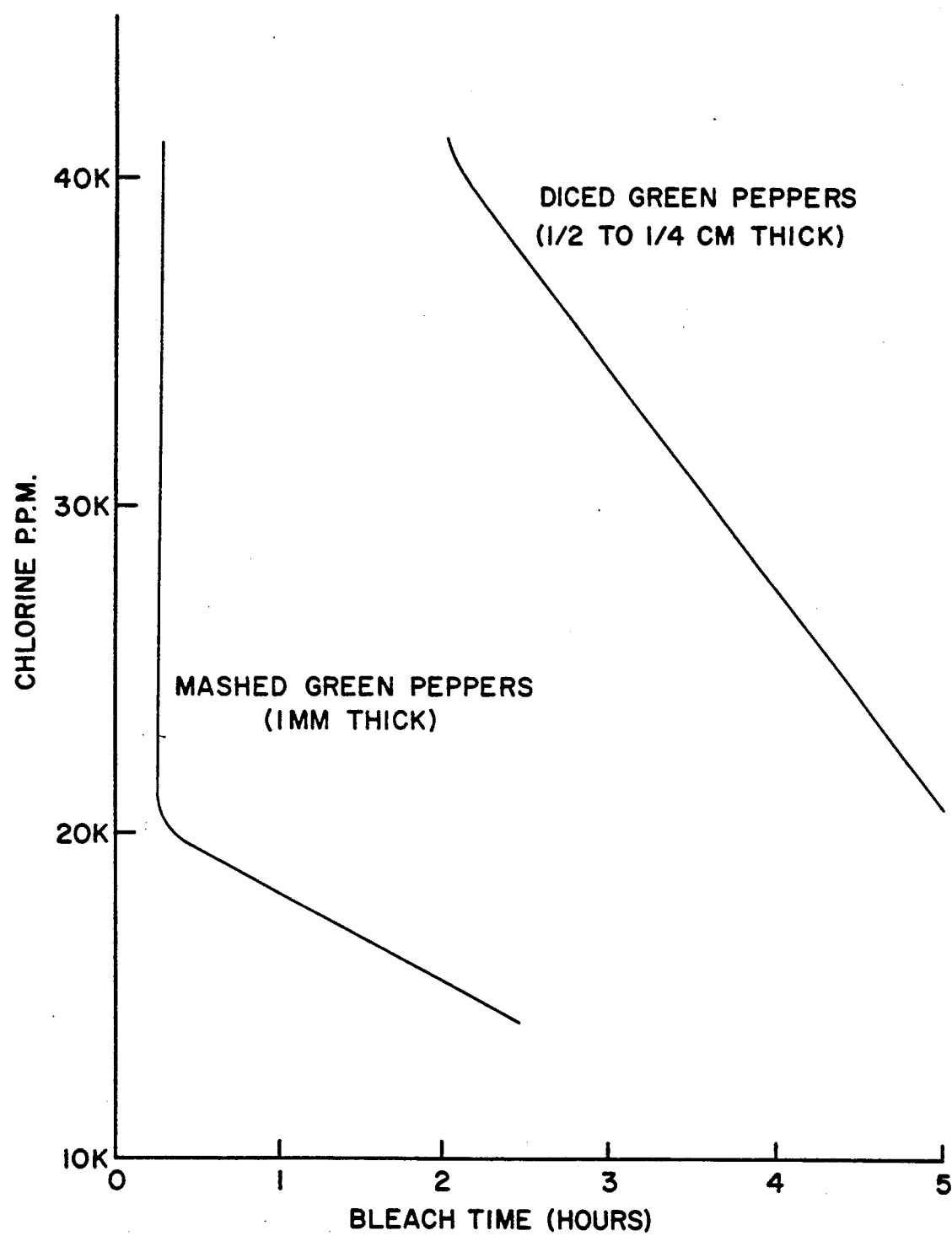
FIG. 2 is a graph illustrating bleaching times of mashed and diced green peppers versus concentrations of chlorine with there being one part pepper in 5 parts dispersion.

Tests were conducted to determine the interaction the amount of chlorine added to green pea hulls, lettuce, sugar beet pulp and green pepper (mashed and diced) slurrys during a bleaching treatment; the results for the interaction between the amount of chlorine added to green pea hulls and bleaching time being set forth in Table I and FIG. 1 showing the bleaching time versus concentration of chlorine; the results for the interaction between the amount of chlorine added to mashed and diced green peppers and bleaching time being set forth in Tables III and IV and FIG. 2 showing the bleaching time versus concentration of chlorine.

TABLE I
GREEN PEA HULLS

| ppm dispersion 1 part hulls to 5 parts dispersion | Elapsed Time | Results |
| --- | --- | --- |
| 1. 5,200 ppm | 24 hours | little noticeable effect on product |
| 2. 7,800 ppm | 24 hours | not acceptable |
| 3. 10,400 ppm | 72 minutes | marginal-not acceptable |
| 4. 13,000 ppm | 35 minutes | marginal |
| 5. 15,600 ppm | 9 minutes | marginally acceptable |
| 6. 18,000 ppm | 8 minutes | acceptable |
| 7. 23,400 ppm | 7 minutes | acceptable |
| 8. 31,200 ppm | 3 minutes | acceptable |
| 9. 46,800 ppm | 3 minutes | acceptable |
| 10. 62,400 ppm | 3 minutes | acceptable |

TABLE II
LETTUCE

| ppm dispersion 1 part lettuce to 5 parts dispersion | Elapsed Time | Results |
| --- | --- | --- |
| 1. 5,200 ppm | 24 hours | not acceptable marginal |
| 2. 10,400 ppm | 24 hours | marginal |
| 3. 15,600 ppm | 20 minutes | acceptable |
| 4. 26,000 ppm | 16 minutes | acceptable |
| 5. 40,600 ppm | 12 minutes | acceptable |

TABLE II-continued

LETTUCE

| ppm dispersion 1 part lettuce to 5 parts dispersion | Elapsed Time | Results |
|---|---|---|
| 6. 46,800 ppm | 9 minutes | acceptable |

TABLE III

MASHED GREEN PEPPERS (1 mm thick)

| ppm dispersion 1 part MGP to 5 parts dispersion | Elapsed Time | Results |
|---|---|---|
| 1. 2,600 ppm | 5 hours | not acceptable |
| 2. 5,200 ppm | 5 hours | not acceptable |
| 3. 10,400 ppm | 2.5 hours | acceptable |
| 4. 20,800 ppm | 15 minutes | acceptable |
| 5. 41,600 ppm | 15 minutes | acceptable |

TABLE IV

DICED GREEN PEPPERS (¼ to ½ cm thick) ppm

| ppm dispersion 1 part DGP to 5 parts dispersion | Elapsed Time | Results |
|---|---|---|
| 1. 2,600 ppm | 5 hours | not acceptable |
| 2. 5,200 ppm | 5 hours | not acceptable |
| 3. 10,400 ppm | 5 hours | not acceptable |
| 4. 20,800 ppm | 5 hours | marginally acceptable |
| 5. 41,600 ppm | 2 hours | acceptable |

FIG. 2 is a graph illustrating bleaching times of mashed and diced green peppers versus concentrations of chlorine when treating one part peppers in 5 parts dispersion. When the peppers were (comminuted) diced into ¼ to ½ cm chunks (versus 1 mm or thinner pieces) it took longer and a greater concentration of chlorine to neutralize the green color (15 minutes at 20,800 ppm versus two hours at 41,600 ppm).

TABLE VI

DRIED SUGAR BEET PULP

| ppm dispersion 1 part DSBP to 5 parts dispersion | Elapsed Time | Results |
|---|---|---|
| 1. 10,500 ppm | 5 hours | not acceptable |
| 2. 13,125 ppm | 5 hours | not acceptable |
| 3. 17,500 ppm | 5 hours | not acceptable |
| 4. 26,250 ppm | 5 hours | not acceptable |
| 5. 52,500 ppm | 15 minutes | acceptable |

The dried sugar beet pulp tested was sort of an unappealing brown color. The acceptable sample was a light tan color. Although it is presently believed the brown coloration included a green component, sufficient tests have not yet been conducted to determine the validity of this belief. In any event it has been found that by bleaching with chlorine, a light tan color fibrous product can be obtained. However, after the chlorine treatment step, by adding peroxide, for example at room temperature, an even lighter colored fibrous product can be obtained.

Figure 3:
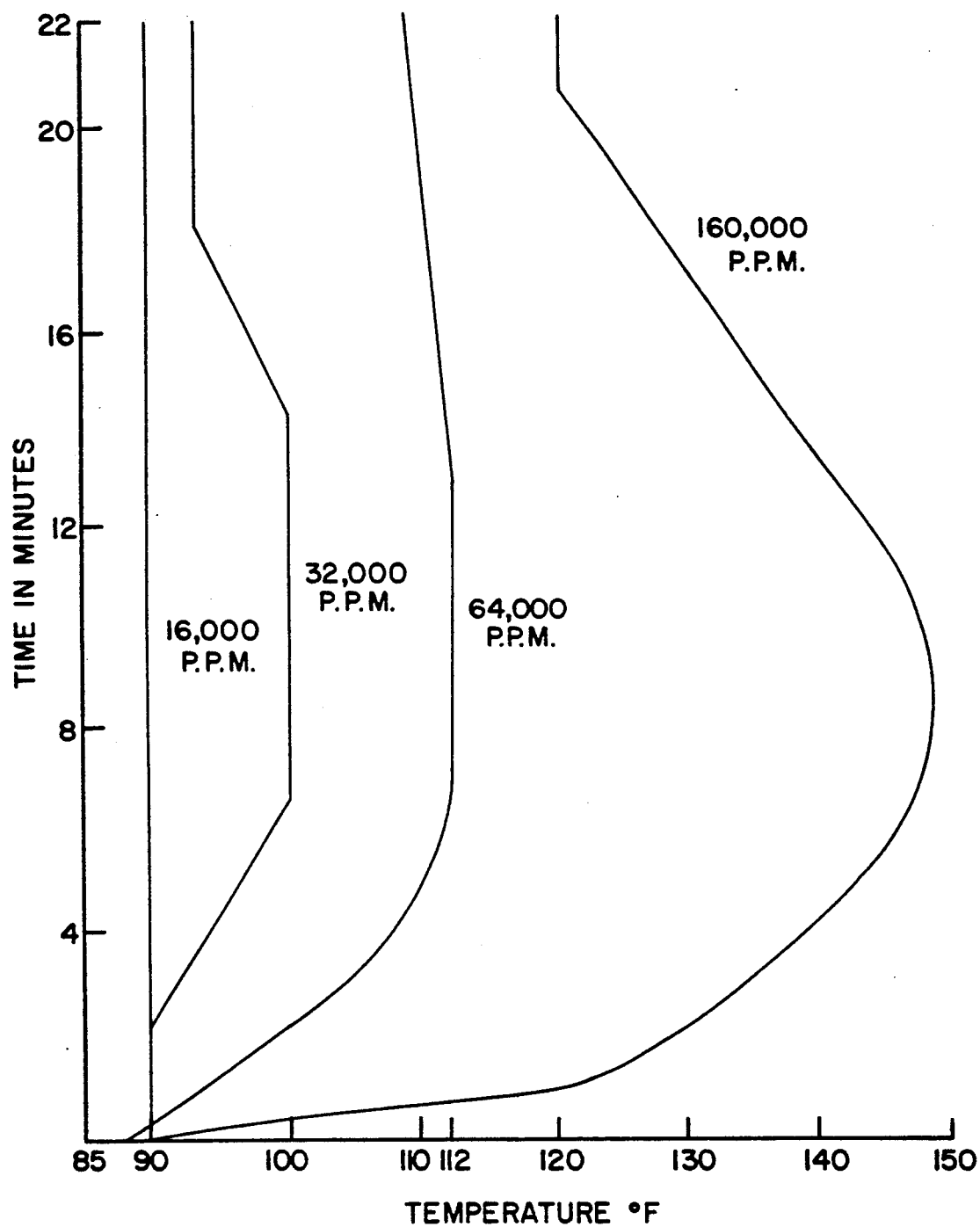
FIG. 3 is a graph showing the variation of the temperature of a dispersion of pea hulls and water over time upon the addition of calcium hypochlorite in quantities to provide the various concentrations indicated.
Figure 4:
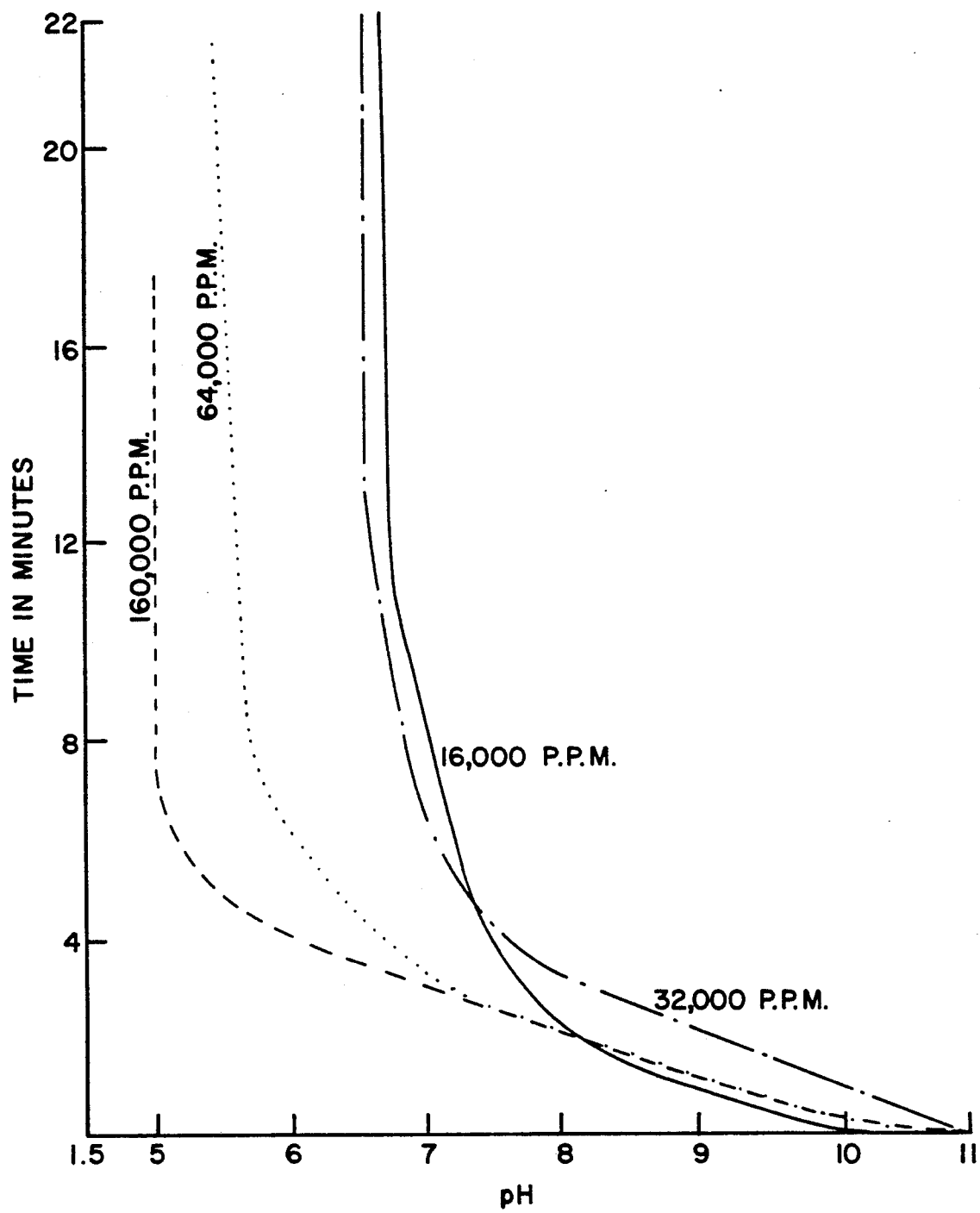
FIG. 4 is a graph similar to that of FIG. 3 other than its shows the variation of pH instead of temperature.

FIG. 3 is a graph that shows variations of temperature of a dispersion of pea hulls and water over time upon the addition of calcium hypochlorite in quantities to provide the various concentrations indicated; and FIG. 4 is the same as FIG. 3 other than FIG. 4 shows variations of pH instead of temperature. Results were recorded for calcium hypochlorite at 16,000, 32,000, 64,000 and 160,000 ppm levels and are presented in the graphs of FIGS. 3 and 4. The graph of FIG. 3 shows there was no temperature rise when adding hypochlorite at the 16,000 level, 90 degrees F.; however, temperatures reached 100 degrees F. and 150 degrees F. when hypochlorite was added at the 32,000 and 160,000 ppm levels respectively. While the pH's equilibrated near neutral (6.50, 6.75), upon adding hypochlorite at the 16,000 and 32,000 ppm levels, the addition at the 160,000 ppm level resulted in the mix becoming acidic. Addition of the hypochlorite much over the 64,000 level (pH 5.5) initiates the degradation of the fiber matrix. Accordingly it is preferred that the pH of the dispersion remain above about 5.5 throughout the chlorine bleaching steps. No peroxide treatment procedure was used with reference to the tests referred to in this paragraph, nor to those set forth in Tables I-V.

To achieve the desired results, that is removing the green color within reasonable time restraints, preferably at least 15,000 ppm chlorine is used in 5 parts dispersant to one part fibrous material. Variations in strengths of dispersion and treatment time, within the specified ranges, are due to the intensity of chlorophyll color to be removed. Advantageously the concentration of chlorine is about 13,500 ppm to 62,000 ppm in water for a period of time of about three to thirty minutes while the concentration is about 23,400 to 46,800 ppm for about three to fifteen minutes. The addition of chlorine from 46,800 ppm to 62,400 ppm has been found to be workable but adds nothing to the bleaching process and may initiate degradation of the fiber matrix. Addition of chlorine beyond 62,400 ppm starts degradation of the fiber matrix.

After the chlorine beach treatment, it is preferred that the product is immersed into a non-toxic peroxide solution, preferably a hydrogen peroxide aqueous solution (at least about 3% and advantageously about 4%) which may be at room temperature until inherent and imparted flavors (for example, chlorine backnotes) are removed.

A feature of this invention is to carry out a bleaching process to avoid the presence of dioxins (PCDD's) in the edible fiber product produced. It is preferred that a hypochlorite approved for food product processes be used in the bleaching process. In using chlorine (gas), the chlorine is applied just below the breakpoint of the chlorine gas in water. That is the chlorine (gas) is added to the dispersion in an amount that through out the bleaching step, the chlorine in the dispersion does not exceed the breakpoint and preferably remains just below the breakpoint. Additionally, during the bleaching step, the amount of chlorine added should be less than that which would result in the pH falling below about 5.5 and preferably is carried out near neutral or slightly alkaline. Also during the bleaching operation, it is preferred that no agent be added to the dispersion to lower the pH. That is, once the chlorine or the chlorine containing salt has been added to the dispersion, it is preferred that the pH be allowed to varied freely and no attempt should be made to raise or lower the level of the pH while the fibrous material is being bleached. The rinsing steps carried out after the bleaching of the fiber and the subsequent peroxide wash are believed to help to avoid the presence of dioxins that otherwise might be in the final product.

Tests were conducted in which hydrogen peroxide was applied for removing flavor from a fibrous material. The strength of peroxide can be reported in at least two ways, strengthen of the peroxide solution applied or amount of 100% peroxide on a pound basis With product being treated. Examples are as follows:

PROCEDURE #5

Yellow pea hulls are subjected to the following peroxide treatment (without the chlorinating treatment) for about 15 minutes at about room temperature to produce a significant blander tasting pea hull.

| Water | 63% |
| --- | --- |
| Peroxide (35% solution) | 15% |
| Yellow pea hulls | 22% |
| Treatment time: | 15 minutes |
| Strength of peroxide | [15% × 35]/78 = 6.7% |
| 100% peroxide/product treated | 5.25/22 = 23.9% |

Amount of peroxide added can be raised to 50%, highest concentration of food grade peroxide economically available, and the treatment time varied from about 5 to 30 minutes still keeping within the spirit of this invention. Longer treatment times are not detrimental.

PROCEDURE #6

Tests were also conducted to determine how effectively a peroxide treatment would deflavor defatted soy flour. To evaluate the peroxide treatment, soy flour was immersed in the hydrogen peroxide solution, boiled for 15 minutes at room temperature and set where peroxide was removed by decantering. The decantering technique was applied due to difficulty in washing a powder. As an example the proportions of soy flour, peroxide and water were as follows:

| Water | 85% |
| --- | --- |
| Peroxide (50% solution) | 3% |
| Soy flour | 12% |
| (Strength of peroxide solution | 1.7%) |

Upon drying the treated flour and comparing its taste with untreated soy flour, it was found that the peroxide treatment rendered the soy flour bland while the untreated flour maintained a strong beany flour. Boiling a slurry with the same strength of peroxide solution enhances flavor removal during treatment.

Instead of a chlorine treatment step for bleaching fibrous material such as disclosed above, such fibrous material advantageously may be bleached by the application of a food grade peroxide, preferably hydrogen peroxide. Food approved peroxide at maximum strength and normal room temperatures will not within reasonable time restraints, whiten yellow, green or brown fibrous materials. As a result of tests made it has been discovered that sufficient whitening of the fibrous materials using peroxide requires elevated temperatures. Most conveniently the elevated temperatures are supplied by steam or hot water. Thus a fibrous material for bleaching may be treated with peroxide in hot water, preferably at or nearer the boiling point. Alternatively, the fibrous material could be treated with peroxide and heated using steam. Having the fibrous material present with more concentrated peroxide, in particular an inorganic peroxide, will improve the whitening action, as will having more peroxide present relative to fiber, on a weight-to-weight basis.

The elevated temperature of the peroxide bleaching treatment is desirably above about 140 degrees F. (60 degrees C.). In some instances, the temperature more desirably is about 195 degrees F. (91 degrees C.) or greater. In a much preferred embodiment of the invention the temperature is about 205 degrees F. (96 degrees C.) or greater. The degree of color removal desired is dictated partly by the starting color of the unbleached fiber.

It has been found that heating peroxide from 120 degrees F. to 212 degrees F. (depending upon the strength of the peroxide and the amount of color to be removed) will whiten the fiber material to either off-white or white coloration with an immersion of the fibers in the peroxide solution, desirably for at least about 5 minutes. The amount of heat required depends upon the strength of peroxide and the amount of color to be removed from the fiber, for example, whitening green hulls to at least an off-white coloration in a 4 to 5 per cent solution required a minimum temperature of 140 degrees F. while a 50 per cent peroxide solution required a minimum temperature of about 120 degrees F. with treatment times for both being about 10 minutes.

The following test was conducted to determine the effect of heating a hydrogen peroxide dispersion.

PROCEDURE #7

Equal weights of green pea hulls were placed in two different glass lined containers. Boiling water and hydrogen peroxide were added to container #1, bringing the mixture to the following preparations:

1 part hulls
2 parts 33% hydrogen peroxide solution
6 parts boiling water

Room temperature water and hydrogen peroxide were added to container #2, bringing the mixture to the following proportions:

1 part hulls
2 parts 33% hydrogen peroxide solution
6 parts water (room temperature)
Strength of peroxide=8.25%
100% peroxide/product treated=66%

Product was treated in the respective containers for 5 minutes and the slurry in both agitated during treatment. The temperature of the slurry in container #1 was maintained at 212 degrees F. during the treatment. Heat from an outside source was not added to container #2 comparing a sample of product treated in container #1 with product treated in container #2, it was found that the product in container #1 was an off-white/cream color while product in container #2 maintained a green color.

Further tests conducted in accordance with procedure #7 were made using a tan fibrous material (yellow pea hulls and soy hulls) and a dark brown fibrous material (whole wheat bran) provided an acceptable whitened fibrous material applying peroxide, the treatment should be carried out at an elevated temperature of about 140° F. or greater. An ideal temperature is about 212° F. or greater.

PROCEDURE #8

Tests were conducted to determine the results of utilizing different temperatures in bleaching with hydrogen peroxide. Green pea hulls were milled and then one part green pea hulls were immersed with hydrogen peroxide solutions for about 10 minutes as set forth below. The results of these tests were as follows:

| % peroxide solution | temperature | results-color |
|---|---|---|
| 4 to 5 % peroxide | room | spring grass green |
| " | 120 to 140° F. | non white pieces scattered throughout green shade |
| " | 140 to 160° F. | fewer non-white pieces scattered throughout than 120 to 140° F. |
| " | boiling | acceptable off-white |
| 50% peroxide | room temperature | spring grass green |
| " | 110° F. | non-white pieces scattered throughout grayish yellow |
| " | 120 to 140 F. | acceptable but a few non-White pieces scattered throughout |
| " | 140 to 160 F. | acceptable off white |
| " | greater than 205° F. | acceptable (white) |

Results of Procedure #8 demonstrate as the temperature of the peroxide was raised from 110 degrees F. to 212 degrees F. (or about 205 degrees or greater), the fiber became whiter. At the lower level of peroxide, it took temperatures of greater than 205 degrees F. to whiten the product to a white color. Better results were obtained applying the 50% peroxide solution at a substantially lower temperature. That is applying the 4-5% peroxide solution at 140°-1460° degrees F. works marginally. However, heating the dispersion beyond the point of varporization is preferred. Applying the 50% peroxide solution, temperatures of 120-140 degrees F. are effective. While better results were obtained applying the 50% peroxide solution, working with with such higher temperatures is more dangerous, material costs are more prohibitive and the process is harder to control, for example, removing peroxide residue applying a steam injection system.

Thus Procedure no. 8 shows that applying the 4-5% peroxide solution at 4:1 dilution (water:product) at elevated temperatures produced an acceptable product in about 10 minutes; and that it has been found that the elevated temperature hydrogen peroxide treatment for bleaching fibrous material for the purposes of this invention is within a desirable range of about 140-212 degrees F. and more desirably about 160-212 degrees F. when utilizing, for example, about one part of about 4% hydrogen peroxide down to about 120 degrees F. using 50% hydrogen peroxide solution for about 10 minutes.

PROCEDURE #9

Tests were conducted to determine the amount of aqueous peroxide dispersion at 212 degrees F. (boiling temperature), required to bleach tan, green and brown fibrous material as follows:

| % $H_2O_2$ | Elapsed time | Results |
|---|---|---|
| | Yellow pea hulls (tan fiber) | |
| 1 | 30 min. | Not acceptable |
| 2 | 20 min. | Marginally acceptable |
| 3 | 5 min. | Acceptable (off-white) |
| 33 | 5 min. | Acceptable (white) |
| | Green pea hulls (green fiber) | |
| 1 | 30 min. | Not acceptable |
| 3 | 5 min. | Acceptable (off-white) |
| 33* | 5 min. | AccepTABLE (white) |
| | Wheat at bran (brown fiber) | |
| 3 | 30 min. | Not acceptable |

| % $H_2O_2$ | Elapsed time | Results |
|---|---|---|
| 33 | 5 min. | Acceptable (white) |

*drained peroxide off prior green pea hull treatment and was reused - i.e. double treatment - see Procedure #10

As may be seen, not only can non-cooked green pea hulls be whiten to at least an off-white by the chlorine treatment disclosed herein, but also hydrogen peroxide can be used at an elevated temperature whereby the green and tan coloration is removed from the hulls while leaving the fiber matrix of green pea hulls and other green hulls (fiber) material and other fibrous material virtually untouched. A minimum of a 3% peroxide solution is required.

After boiling yellow pea hulls in a 1% hydrogen peroxide solution for about 20 minutes to one hour, the hulls did not develop an acceptable color, however boiling the hulls in a 2% peroxide solution for about 25 minutes whitened the hulls enough for being used in the white bread formulations disclosed herein.

Some soy hulls or the outer shell of the soybeans, have a hilum or black spot that appears where the bean is attached to the pod. Tests were conducted to see if a boiling peroxide solution would whiten the hilum as well as the tan color inherently part of the hulls. Percentages of water, peroxide and soy hulls blended for these tests were as follows:

| Water | 73% |
|---|---|
| Peroxide (50% solution) | 20% |
| Soy hulls | 7% |
| (10.7% peroxide solution) | 8% |

After being boiled in the hydrogen peroxide solution for about 5 minutes, the hulls, including the hilum, developed an acceptable off-white color.

In addition to conducting tests for bleaching fibrous material in a heated water solution, tests were conducted to determine if spraying the product to be bleached with a peroxide solution and then applying steam was as effective as immersing the product in a heated peroxide solution. For example, the steam may be applied to directly contact the peroxide solution that was sprayed onto the fibers or use steam out of contact with peroxide sprayed fibers to heat the peroxide solution that contacts the hulls sufficiently to vaporize (turn to steam) the solution. As indicated above, it took 4 parts of a boiling 3% hydrogen peroxide solution from 5 minutes to whiten one part yellow pea hulls to an off-white or, on the basis of a 100% peroxide solution, it takes 12 parts boiling peroxide solution to whiten 100 parts hulls; and applying steam it was found that it took one part of a 15% peroxide solution from 5-10 minutes to whiten 3 parts yellow pea hulls, or, on the basis of 100% peroxide solution, it takes 5 parts of peroxide to whiten 100 parts hulls to an off-white condition.

The application of steam does have an economic advantage over the application of heated or hot water in that less peroxide is required and in that the fibrous material does not have to be separated from the water and dried as much after the treatment.

The following describes one method for dispersing the peroxide uniformly throughout the hulls and applying steam to whiten fibrous and other material:
1. The peroxide solution is sprayed on the hulls being conveyed by a horizontal screw type mixer.

2. The product is then deposited in a jacketed screw type conveyor and then subjected to steam. Treatment lasts from about 5-10 minutes.
3. The sprayed and steamed product then passes through a tumbler, or rotating drum, where the product is subjected warm air to ensure excess moisture is removed.
4. The product is now ready to be milled, as required.

PROCEDURE 10

Tests were conducted to determine if the hydrogen peroxide in water could be used for bleaching more than one batch of fibrous material as follows:

Yellow pea hulls, hydrogen peroxide and water were blended in the following proportions:
1 part pea hulls
2 parts 35% hydrogen peroxide
8 parts water heated to 212 degrees F.
(7% peroxide solution)

The slurry was agitated and a temperature of about 212 degrees F. maintained until product was bleached to an acceptable off-white color (approximately 5 minutes). Approximately 4 parts of the bleaching solution was then drained from the slurry and blended with 1 part unbleached yellow pea hulls. The slurry was agitated and a temperature of about 212 degrees F. maintained until the hulls were whitened as required. Such tests proved that the peroxide when utilized as set forth herein can be drained off and reapplied for bleaching more than one batch.

PROCEDURE #11

One of the drawbacks of bleaching fibrous material with chlorine or hydrogen peroxide based solutions has been the foaming reaction between the bleaching agent and the fibrous material being treated. As foam is washed from the processed fiber, it pollutes runoff and thus becomes a problem. The following procedure shows how the foaming problem was eliminated.

Sample A—Yellow pea hulls are taken from the pea splitter, milled mixed with a peroxide solution in the following:
1 part milled yellow pea hulls
4 parts 4% peroxide solution As peroxide reacted with the ground hulls at about room temperature, a thick foam was produced.

When the above was repeated as set with the peroxide solution heated to 212 degrees F., the product still foamed.

Sample B—Yellow pea hulls were taken from the splitter and sifted until only hull fragments ⅛ inches in diameter remained. The remaining hull fragments were mixed with peroxide in the following proportions:
1 part yellow pea hulls
4 parts 4% hydrogen peroxide solution There was no foaming as the peroxide reacted with the hull fragments at about room temperature.

When the sample B test was repeated as set forth above at about 212 degrees F. or greater temperature, there was no foaming.

These test show that prior to the bleaching treatment of this application, extraneous matter such as pea pieces, wood fragments and fiber flour should be removed from the larger fiber flakes to maintain a relatively foam free discharge stream. The increasing of temperatures of the bleaching treatment did not have an effect on the foaming action.

There is no truly objective method for measuring color of an off-white granular ingredient, particularly when a surface is not smooth. Therefore, an acceptable product is defined herein as one that can be incorporated with the ingredients used for making a white or off-white high fiber bakery item without significantly altering color or flavor of the item from what it would have been without the addition of product. Whiteness, in some instances, was recorded as it relates to brightness defined as a measure of the degree of refectivity of the sample with respect to blue light (475 nm) where in the sample is illuminated at a 45 degree angle of incidence and viewing is at 0 degree, or perpendicular to the plane of the sample The standard brightness scale is based on the reflectance of magnesium oxide of 100%. Readings for untreated and whitened yellow pea hulls with about a −120 mesh screen size were as follows:

|  | L* | a* | b* |
| --- | --- | --- | --- |
| Untreated | 87.86 | .3 | 9.1 |
| Whitened | 92.09 | 0 | 8.8 |

Where L* represents lightness increasing from zero for black to 100 for white.

a* represents redness when a positive value, greenness when a negative value and zero for gray.

b* represents yellowness where a positive value, blueness when a negative value and zero for gray.

Mesh size is critical when reflected light is used to measure whiteness, for example, the brightness reading for unbleached, about −16 mesh screen size untreated yellow pea hulls is 71.7 (L*), 3.0 (a*) and 20.9 (b*).

The data collected below is from work done on green pea hulls, a typical edible green hull product. Both crude fiber (cellulose and lignin as determined by A0AC method 7.066, 14th edition) and dietary fiber (Prosky method) AOAC 43,A14 are presented below to show the hulls are not reduced to crude fiber by the procedures disclosed in this invention (with just the chlorine treatment or the combination of chlorine and peroxide treatment).

| Fiber content - yellow and green pea hulls (general) | |
| --- | --- |
| Crude Fiber | 40-50% |
| Total Dietary Fiber | 75-85% |
| Fiber content - unbleached green pea hulls | |
| Crude Fiber | 40% |
| Total Dietary Fiber | 71% |
| Fiber content - bleached green pea hulls | |
| Crude Fiber | 46% |
| Total Dietary Fiber | 76% |

The following results from tests on a second sample of green hulls carried out as set forth in the preceding paragraph for crude fiber (A0AC method 7.066, 14th edition), soluble fiber (Prosky), insoluble dietary fiber (Prosky), A0AC 43,A14, confirms none of the insoluble nor soluble fiber fractions are lost and therefore the matrix is intact after applying the bleaching process of this application (without significant degradation of the fiber matrix).

TABLE VI

| Insoluble Fiber (which includes) | Green Pea Hulls before treatment | Green Pea Hulls after treatment |
| --- | --- | --- |
| Cellulose | 40% | 46% |
| Lignin | | |

TABLE VI-continued

| Insoluble Fiber (which includes) | Green Pea Hulls before treatment | Green Pea Hulls after treatment |
|---|---|---|
| Small part of hemicellulose Hemicellulose Insoluble pectins Insoluble gums Pentosans | 29% | 35% |

TABLE VII

| Soluble Fiber (which includes) | Green Pea Hulls before treatment | Green Pea Hulls after treatment |
|---|---|---|
| Soluble gums (Including B Glucan) Soluble pectin Soluble hemicellulose Polysaccharides (Not susceptible to enzyme digestion) | 5% | 5% |
| Total Dietary Fiber (Soluble & Insoluble) | 74% | 86% |

One would expect the bleached pea hulls to be higher in crude and total dietary fiber due to the removal of cotyledon fragments that cling to the hulls and are removed during the washing stages of the process. The above results indicate the bleaching process of this invention had little, if any, effect on the fiber matrix.

Since determining product loss during treatment using the AOAC and Prosky methods cited above are time consuming and expensive, samples were checked for losses by weighing samples before and after treatment, for example:
Sample size
25 grams pea hulls
100 mls—50% hydrogen peroxide The strength of the peroxide in this dispersion was 50% or on the basis of 100% peroxide, the dispersion contained 2 part peroxide per 1 part fiber (as strong a peroxide solution applied during these tests). The dispersion was subjected to the boiling peroxide solution for 10 minutes until whitened, at which time it was dried and weighed. Loss incurred treatment was calculated as follows:
Data
weight before processing—25 gms
weight after processing—23.4 gms
% loss = [0.25-23.4]/25 = 6.4%
6.4% would be considered a normal handling loss and little, if any, due to the treatment.

Tests were conducted to determine the effect on a food product (bread) of adding first yellow pea hulls and then green pea hulls with chlorine, hydrogen peroxide at about room temperature and a combination of chlorine and peroxide. Hulls were evaluated after being milled to a −40 mesh size, a −80 mesh size and in a bread product. The bread formula applied evaluating all samples was as follows:

| Wheat flour | 100% |
|---|---|
| Water | 130%** |
| Fiber | 24%* |
| Sugar | 11%* |
| Salt | 2% |
| Shortening | 4% |
| Dry yeast | 1.5% |

*Flour basis
**Absorption varied due to different treatments of the fiber.

Results of the tests were summarized in the following table

TABLE VIII

| Product | Treatment | Color & Flavor −40 Mesh | Color & Flavor −80 Mesh | Bread |
|---|---|---|---|---|
| 1) Yellow pea hulls | Untreated | Tan with a grey background pea flavor | Tan with a grey background pea flavor | Grey cast - mild pea flavor |
| 2) Green pea hulls | Untreated | Mature grass green color pea flavor | Mature grass green color pea flavor | Grey cast - mild pea flavor |
| 3) Yellow pea hulls | 2.63% sodium hypochlorite | Cream color slight chlorine flavor | Off white slight chlorine flavor | Light tan color slight chlorine backnote |
| 4) Green pea hulls | 2.63% sodium hypochlorite | Cream color slight chlorine flavor | Off white slight chlorine flavor | Light tan color slight chlorine backnote |
| 5) Yellow pea hulls | 17.5% hydrogen peroxide | Tan with a grey background bland flavor | Tan with a grey background bland flavor | Grey cast bland flavor |
| 6) Green pea hulls | 17.5% hydrogen peroxide | Spring grass green color bland flavor | Spring grass green color bland flavor | Grey/green cast bland flavor |
| 7) Yellow pea hulls | 2.63% sodium hypochlorite 17.5% hydrogen peroxide | Cream color bland flavor | Off white color bland flavor | Off white color bland flavor |
| 8) Green pea hulls | 2.63% sodium hypochlorite 17.5% hydrogen peroxide | Cream color bland flavor | Off white color bland flavor | Off white color bland flavor |

Test reported in Table 8 prove chlorine, when applied to fibrous materials as described in this invention, removes green color and flavor but imparts a slight chlorine backnote and peroxide, which preferably is hydrogen peroxide, when applied to fibrous materials as described herein, reduces flavor and removes remaining colors and slight backnotes imparted by the chlorine.

In accordance with this invention the non-cooked green pea hulls are subjected to a simple treatment in an aqueous dispersion with chlorine (gaseous or salt form) at a concentration and for a period effective to remove substantially all of the green coloration with very little removal of soluble or insoluble fibers. The chlorine residue can be removed by using just water rinses, then the bleached fiber is dried. However for many uses the water rinsed, chlorine treated fiber is treated with hydrogen peroxide, advantageously at room temperature as contrasted to the elevated temperature peroxide treatment, and then water washed and dried.

The following example illustrated the application of the invention and are not intended to limit the application of invention which goes well beyond just the food products listed.

A low calorie* bread product was baked after making a bread dough by adding the milled deflavored bleached (chlorine treatment followed by the flavor removing peroxide treatment) green pea hulls to the following formula:

| BREAD FORMULA #1 | |
|---|---|
| Wheat flour (white or whole wheat) | 100.0% |
| Water | 113.0%** |
| Bleached hulls | 34.0%** |
| Sugar | 11.0%** |
| Vegetable Shortening | 4.0%** |
| Salt | 2.5%** |
| Pea Flour | 2.0%*** |
| Instant Dry yeast | 2.0%** |

*⅓ fewer calories than standarized white bread by FDA regulation
**flour basis
***optional A high fiber bread product was baked after preparing a bread dough by adding the milled bleached (without the elevated temperature treatment) green pea hulls to the following formula:

| BREAD FORMULA #2 | |
|---|---|
| Wheat flour | 100.0% |
| Water | 72.0%* |
| Bleached hulls | 12.0%* |
| Sugar | 11.6%* |
| Vegetable shortening | 4.0%* |
| Salt | 1.0%* |
| Pea flour | 2.0%** |
| Instant dry Yeast | .1%* |

*flour basis
**optional

| BREAD FORMULA NO. 3 | |
|---|---|
| Wheat flour | 100.0% |
| Water | 70.0% |
| Whitened pea fiber | 15.0% |
| Sugar | 6.0% |
| Vegetable shortening | 4.0% |
| Salt | 2.0% |
| Yeast | 4.0% |
| Dough conditioner | *3.25% |
| Mold inhibitor* | .25% |

*optional

A low calorie white dough (Formula No. 3 above) was baked adding pea fiber, bleached by spraying a 15% peroxide solution at a 1:3 (hydrogen peroxide solution/fiber)ratio prior to a steam treatment, in the proportion indicated in Formula 3.

It is important to note the above formulas, with fiber bleached and deflavored in accordance with this invention, do not require the addition of gums, vital wheat gluten or other dough strengtheners because fiber produced by the processes contains a balanced matrix (cellulose, lignin, pectin, etc.) unlike more highly processed fiber made available by techniques disclosed by prior art know to applicant. The balanced fiber matrix is as it occurs naturally (other than color), the fiber has not been processed so just the crude fiber remains.

Other key requirements for a low calorie product are met by baking bread from Formula No. 1 or 3. First of all, a low calorie dough must have the capacity to absorb and retain large quantities of water. The fiber produced by bleaching the green or yellow pea hulls absorbs between 3-4 times its own weight in water determined by adding as much water as possible to the pure fiber without the presence of free water or runoff. While intuitively it appears bread baked from the above formula has an unusually high rate of absorption, water absorption tests have not yet been made to compare it with other fiber sources. Also, since a natural high fiber bread appeals to the health conscious, it is advantageous that the color of the fiber source blends in with the unbleached or white bread flour. A third requirement for a bread product is that it be organoleptically acceptable. The most restricting factor when considering the amount of a natural fiber source, such as pea fiber, that can be added is the flavor imparted. This flavor, of course, intensifies as more fiber is added. Fiber prepared by just the chlorine treatment disclosed herein has a cleaner (mellow) flavor than do untreated yellow pea hulls. Using the peroxide flavor removing treatment after the chlorine treatment with rinsing, results in a blander flavor than just the chlorine treatment. Accordingly a greater amount of treated pea fiber flour can be used in making a bakery product without imparting a level of pea flavor that is unacceptable to many people and thereby a higher fiber content can be incorporated in a commercial product, for example bakery products.

The bleached fibrous flour made in accordance with this invention (with just the chlorinated treatment, or the combination of chlorine and peroxide flavor removing treatment, or the described peroxide treatment alone) also can be used in making low calorie foods other than bread-type products, for example, pasta/macaroni, pancakes/waffles, muffins, cereals, extruded snacks, yogurt, sauce/dips, etc.

EXAMPLE #1

Pasta, comparable to spaghetti/macaroni, was prepared adding the milled deflavored bleached green pea hulls to the following formula:

| Semolina | 67.5% |
|---|---|
| Water | 26.4% |
| Pea hulls | 6.1% |
| | 100.0 (weight basis) |

EXAMPLE #2

Extruded cereals and snacks can be prepared adding milled, deflavored bleached green pea hulls to the following formula:

| Corn flour | 67.5% |
|---|---|
| Water | 26.4% |
| Pea hulls | 6.1% |
| | 100.0 (weight basis) |

EXAMPLE #3

High fiber muffins were prepared adding deflavored bleached green pea hulls to the following formula:

| | |
|---|---|
| Whole wheat flour | 100% |
| Whole milk | 160%* |
| Sugar | 22%* |
| Eggs | 21%* |
| Bleached hulls | 16%* |
| Shortening | 11%* |
| Molasses | 8%* |
| Baking powder | 6%* |
| Salt | 2%* |
| Vanilla | to taste |

*flour basis

The above are examples of one application of the present invention. The products of Examples 1-3 can be prepared using the chlorine bleached pea hull fibers that are subjected to the peroxide flavor treatment to remove flavor components and chlorine backnotes. Of course if the elevated temperature peroxide treatment is used for bleaching in the first instance, the flavor components are removed with no possibility of chlorine backnotes. There are many other edible green fiber sources (parsley, lettuce, green peppers, sugar beet pulp, etc.) that can be similarly processed to produce commercially acceptable ingredients. Keeping within the spirit of this invention, in many instances vegetables that cannot be absorbed by the fresh, canned or frozen market can be processed to produce commercially acceptable ingredients.

To be noted is that the process of making the fiber flour by bleaching with chlorine followed by the peroxide flavor removing treatment of this invention does not include cooking or applying heat to the fibrous material in the chlorine or in the peroxide dispersion, nor treatment with an alkaline product. Thus the chlorine treating process is less complex than the previously mentioned prior art and does not result in any significant loss of fiber components. However the peroxide solution treatment following the chlorine treatment may be heated with no detrimental effect. Further it is to be noted that utilizing hydrogen peroxide in a single treatment process at room temperature does not provide an acceptable off-white or white fiber product for the purposes of this invention. However using hydrogen peroxide at an elevated temperature, desirably at least 120 degree F. (depending upon concentration), and preferably at least at about 195° F. or greater, and more preferably 205° F. or greater, without a prior chlorine treatment such as disclosed herein, does provide an off-white or a white fibrous product with the fiber matrix virtually untouched (balanced fiber matrix) and that the thus treated fiber material can be used in place of chlorine bleached green pea hulls or other chlorine bleached fibrous material for making edible food products such as disclosed relative to using chlorine treated fibers. Also the fibrous product is not cooked prior to the chlorine or elevated temperature hydrogen peroxide treatment.

The fibrous material (vegetable and cereal grain fibrous material) that is treated with the chlorine bleaching treatment with or without the peroxide flavor removing treatment, or the elevated temperature peroxide treatment, is unprocessed as defined herein. The vegetable fibrous material is of a type that is edible and comprises leafs, leaf stems, cereal gran bran and hulls. The flavor removing treatment following the chlorine treatment may be at a temperature above room temperature. The peroxide flavor removing treatment following the chlorine treatment in many instances provides superior color removal for obtaining a sharper white fiber than without the flavor removing treatment.

With the fibrous material bleached in accordance with this invention, substantially all of the product that is separated from the bleaching and water washing operations is indigestible by human beings.

With reference to the peroxide bleaching treatment, in place of using hot water and steam as heat sources, other sources of heating may be used, for example, the peroxide impregnated fiber may heated by being passed through a narrow heated tubes for a short period of time.

What is claimed is:

1. A process for bleaching edible green fibrous vegetable products, including green pea fiber hulls, comprising subjecting the green fibrous vegetable products to chlorine in an aqueous dispersion at an effective concentration and for an effective period of time to remove substantially all the green coloration from the vegetable fiber while leaving a substantially balanced fiber matrix and then rinsing the product to remove chlorine residue.

2. The process of claim 1 wherein the chlorine is applied to the dispersion in the form as one of a chlorine gas and a chlorine containing salt acceptable for food processing.

3. The process of claim 1 wherein the chlorine is in an amount of about 13,500 ppm to 62,400 ppm to about five parts by weight of the dispersion.

4. The process of claim 3 wherein the chlorine is at a concentration of about 15,600 ppm to 46,500 ppm for a period of time of about three to ten minutes.

5. The process of claim 3 wherein the ratio of weight of dispersion to fibrous product is about 5 to 1 and that the product is subjected to the chlorine for about three to thirty minutes.

6. The process of claim 5 wherein the product is one of green pea hulls, parsley, and green peppers.

7. The process of claim 6 wherein the vegetable product is milled green pea hulls.

8. The process of claim 6 wherein after the rinsing step, the rinsed product is immersed in at least about a 4% peroxide solution for a period of time to remove inherent flavor components, and chlorine backnotes, thence separating the peroxide solution from the product immersed therein and thereafter rinsing the last mentioned separated product.

9. The process of claim 8 wherein the rinsed product is dried, and thereafter comminuted to provide a high fiber flour, and that the peroxide solution is a 4-50% hydrogen peroxide aqueous solution.

10. A process of preparing a high fiber flour, comprising the steps of subjecting milled green pea hulls in an aqueous dispersion of about 13,500 to 62,400 ppm chlorine per about 5 parts dispersant for about three to thirty minutes to remove the green coloration of the milled hulls, and then removing chlorine residue from the hulls and thence drying the hulls.

11. The product obtained by the process of claim 10.

12. The process according to claim 10, wherein the amount of pea hulls to dispersant is about one part pea hulls to five parts of dispersant and the concentration of chlorine is about 15,600 ppm to 46,000 ppm.

13. A process of preparing a high fiber flour, comprising the steps of comminuting edible vegetable fibrous material, subjecting the comminuted material to chlorine in an aqueous dispersion at an effective concentration that remains below about 62,400 ppm and at an effective period of time that is less than about thirty minutes for removing undesirable coloration without significant degradation of the fiber matrix and thence rinsing to remove chlorine residue.

14. The process of claim 13 wherein the vegetable fibrous material is one of green pea hulls and yellow pea hulls, that the aqueous dispersion is of about 13,500 ppm to less than about 62,400 ppm chlorine per about 5 parts dispersant, that the period of time is at least 3 minutes and after the chlorine residue is removed, the step of drying the comminuted hull.

15. The process according to claim 14, further characterized in that the amount of pea hulls to dispersant is about one part pea hulls to five parts of dispersant and the concentration of chlorine is about 15,600 to 46,500 ppm 16. The process of claim 13 wherein the rinsed chlorine treated material is immersed in at least about a 4% solution of peroxide for an effective period of time for removing material flavor components and chlorine backnotes to provide a blander material, separating the peroxide solution from the immersed material, and thence rinsing the material after being separated from the peroxide solution.

17. The process of claim 16 wherein the immersion step is for a period of about 15 minutes, that the rinsed material separated from the peroxide solution is thence dried and comminuted to a size wherein about 99% will pass through a −40 mesh screen to provide a high fiber flour.

18. The process of claim 17 wherein the vegetable fibrous material is one of green and yellow pea hulls and that the high fiber flour is mixed with water and cereal flour to form a dough for an edible food product, and that the chlorine in the aqueous solution is at least about 13,500 ppm.

19. A process for removing flavor components from a comminuted, edible vegetable fibrous material, including edible green and yellow pea hulls, comprising the step of immersing comminuted, edible vegetable fibrous material in a solution of at least about 4% of a peroxide for an effective period of time to remove inherent fiber flavor components without significant degradation of the fiber matrix for obtaining a blander flavor.

20. The process of claim 19 wherein the solution having the peroxide therein is at about room temperature and that prior to the immersion step, the fibrous material is subjected to chlorine in an aqueous solution of about 13,500–62,000 ppm for about 3 to 30 minutes and water washing the chlorine treated material, and that after the immersion step, the peroxide treated material is dried and comminuted to provide a high fiber, low calorie flour.

21. The process of claim 19 wherein the period of time is up to about 15 minutes.

22. The process of claim 19 wherein the fibrous material is one of green pea hulls and yellow pea hulls, and that after the immersing step, the additional steps of separating the fibrous material from the solution, thence water rinsing the separated fibrous material, thereafter drying the separated fibrous material, and comminuting the dried material.

23. The process of claim 22 wherein prior to the immersion step the pea hulls are subjected to chlorine in an aqueous solution of about 13,500–62,400 ppm chlorine for about 3 to 30 minutes to bleach the hulls.

24. A method for making a dough for an edible baker product, comprising bleaching ground pea hull fibers in an aqueous solution of chlorine in a gaseous form or a chlorine salt suitable for food preparations in a concentration of about 13,500 ppm to 62,400 ppm chlorine for a period of about three to thirty minutes to remove substantially all the coloration from the fibers, then removing the chlorine residue from the bleached fiber by washing with water, then separating the wash water from the washed fibers, and thereafter combining the washed fibers with unbleached wheat flour, water, sugar, shortening, salt and a leavening agent.

25. The method of claim 24 wherein the ground pea hull fibers are green or yellow pea hulls, the concentration of and the maximum period of time of subjecting the hulls to chlorine is that effective to bleach out substantially all of the green or tan coloration from the the green or yellow pea hulls while leaving fiber matrix with substantially the same crude and dietary fiber content that it had prior to the bleaching step.

26. A method of making a dough for an edible food product comprising bleaching one of edible vegetable and cereal grain fibers in an aqueous solution of one of chlorine in a gaseous form and a chlorine salt compound of about 13,500 ppm to 62,400 ppm chlorine for an effective period of time for substantially reducing undesirable coloration from the fibers while leaving a substantially balanced fiber matrix, the effective period of time being about 3 to 30 minutes, then removing the chlorine residue by washing with water, thence separating the wash water from the washed fibers and thereafter combining the washed fibers with a cereal grain flour and water.

27. The process of claim 26 wherein between the steps of separating the wash water from the fibers and the combining of the washed fibers with a cereal grain flour, the steps of immersing the separating washed fibers in an aqueous solution containing at least 4% of a non-toxic peroxide compound for a period of up to about 15 minutes at a temperature of about room temperature to boiling to remove chlorine, including reacted chlorine, and inherent flavor components, separating the aqueous solution from the fibers that was contained therein, thence water washing the peroxide treated fibers and separating the peroxide wash water from the peroxide treated fibers.

28. The process of claim 27 wherein the peroxide compound is hydrogen peroxide, the peroxide immersion step is for a period of at least about 5 minutes, and the fibers are one of green pea hull fibers and yellow pea hull fibers.

29. A process for bleaching an edible vegetable stems, leaves and hulls fibrous material, and a cereal grain bran material that is of a non-off white and a non-white coloration, comprising subjecting the material in (a) chlorine in an aqueous dispersion at a concentration of about 13,500 ppm to less than about 62,400 ppm, or (b) a food grade peroxide solution at a temperature of at least about 140 degrees F., at an effective concentration and for an effective period of time to remove substantially all of the coloration of the fiber material to provide a product of one of a white and an off-white coloration.

30. The process of claim 29 wherein the material is a non-cooked comminuted material.

31. The process of claim 29 wherein material is immersed in chlorine in an aqueous dispersion at a concentration of about 15,000 ppm to 46,000 ppm for at least three minutes and separated from the dispersion in time to leave a substantially balanced matrix, then the product is water rinsed, and thereafter the water rinsed product is immersed in at least a 4% hydrogen peroxide solution for at least about 5 minutes and thence separated from the peroxide solution.

32. The process of claim 29 in that the product is mixed with water and a cereal flour to form a dough for an edible food product.

33. The process of claim 29 wherein the material is immersed in a hydrogen peroxide solution for at least about 5 minutes, and thence separated from the peroxide solution.

34. The process of claim 33 wherein the hydrogen peroxide solution is about 212 degrees F. and that the product is mixed with water and a cereal flour to form a dough for an edible food product.

35. The process of claim 33 wherein the fiber material is derived from a green vegetable and that the temperature is boiling.

36. The process of claim 29 wherein the material is immersed in an aqueous solution containing chlorine and the period of time is at least about 5 minutes.

37. The process of claim 29 wherein the material is subjected (a) being immersed in a hydrogen perioxide solution at a temperature of at least 195° F. or (b) to a hydrogen peroxide solution of a strength of at least about 3% and thence to steam.

38. A process for bleaching edible vegetable and cereal grain fibrous material products, comprising subjecting the product to (a) chlorine in an aqueous dispersion, or (b) a food grade peroxide solution at a temperature of at least 140° F. that is at an effective concentration and for an effective period of time to remove coloration from the fibrous material to provide a product of one of a white and an off white coloration while leaving a substantially balanced fiber matrix.

39. The process of claim 38 wherein the fibrous material is subjected to a hydrogen peroxide solution of a concentration of at least about 4% and a temperature of at least about 205° F.

40. The process of claim 39 wherein the period of time is between about 5 and 30 minutes.

41. The process of claim 39 wherein the product is mixed with water and a cereal flour to form a dough for an edible food product.

42. The process of claim 39 wherein the fibrous material is subjected to a hydrogen peroxide solution and thence to steam for at least about 5 minutes.

43. The process of claim 39 wherein the fibrous material is subjected to a peroxide solution of a strength of at least about 4% and heated to a temperature of at least about 195° F. and a period of time of about 5 minutes to about 30 minutes.

44. A process for removing flavor components from a comminuted an edible soy bean material, comprising the step of subjecting the soy bean material to a solution of at least about 3% of an inorganic peroxide at an effective temperature and for an effective period of time to remove a substantial amount of the beany tasting flavor components to obtain a blander flavor.

45. The process of claim 44 wherein the soy bean material is defatted soy flour.

46. The process of claim 45 wherein the period of time is between about 5 minutes and 30 minutes and the temperature is at least about 140° F.

* * * * *